(12) United States Patent
Vanderveen et al.

(10) Patent No.: US 11,750,565 B2
(45) Date of Patent: Sep. 5, 2023

(54) METHOD AND SYSTEM FOR UPDATING OF AN APPLICATION LAYER FOR A THIRD-PARTY TELEMATICS PROVIDER

(71) Applicant: BlackBerry Limited, Waterloo (CA)

(72) Inventors: Michaela Vanderveen, Tracy, CA (US); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/581,090

(22) Filed: Jan. 21, 2022

(65) Prior Publication Data

US 2022/0150218 A1    May 12, 2022

Related U.S. Application Data

(63) Continuation of application No. 16/453,514, filed on Jun. 26, 2019, now Pat. No. 11,258,762.

(51) Int. Cl.
*H04L 29/06* (2006.01)
*H04L 9/40* (2022.01)

(52) U.S. Cl.
CPC ...... *H04L 63/0263* (2013.01); *H04L 63/0236* (2013.01)

(58) Field of Classification Search
CPC .. H04L 63/0263; H04L 63/0236; G06F 21/00
See application file for complete search history.

(56) References Cited

U.S. PATENT DOCUMENTS

| | | | |
|---|---|---|---|
| 6,158,008 A | * | 12/2000 | Maria ............ H04L 9/40 726/13 |
| 7,451,234 B1 | | 11/2008 | Bonner |
| 7,849,502 B1 | | 12/2010 | Bloch et al. |
| 10,298,543 B2 | | 5/2019 | Glenn et al. |
| 10,887,333 B1 | | 1/2021 | Pereira et al. |
| 2005/0135241 A1 | | 6/2005 | Hippelainen |
| 2008/0148380 A1 | | 6/2008 | Abzarian et al. |
| 2008/0235511 A1 | | 9/2008 | O'Brien et al. |
| 2012/0311693 A1 | | 12/2012 | Horman et al. |
| 2013/0091538 A1 | | 4/2013 | Chirra et al. |

(Continued)

FOREIGN PATENT DOCUMENTS

| | | |
|---|---|---|
| CN | 101340444 A | 1/2009 |
| CN | 108809892 A | 11/2018 |
| EP | 3334129 A1 | 6/2018 |

OTHER PUBLICATIONS

Eastlake III, D.; "Transport Layer Security (TLS) Extensions: Extension Definitions"; RFC 6066; Jan. 2011; 25 pages.

(Continued)

*Primary Examiner* — Vance M Little
(74) *Attorney, Agent, or Firm* — Conley Rose, P.C.; J. Robert Brown, Jr.

(57) ABSTRACT

A method at a system including a firewall and at least one application, the method including obtaining, at the at least one application, a new address for a service provider for the at least one application; triggering a firewall update; obtaining a new firewall configuration; and updating the firewall, wherein the updating the firewall allows a connection from the at least one application to the new address for the service provider.

20 Claims, 10 Drawing Sheets

(56) References Cited

U.S. PATENT DOCUMENTS

| | | |
|---|---|---|
| 2013/0212680 A1* | 8/2013 | Winn .................... H04L 51/212 |
| | | 726/23 |
| 2014/0207917 A1* | 7/2014 | Tock ................. H04L 41/0895 |
| | | 709/220 |
| 2016/0359809 A1 | 12/2016 | Phonsa et al. |
| 2017/0126625 A1 | 5/2017 | Haak et al. |
| 2017/0230333 A1 | 8/2017 | Glazemakers et al. |
| 2018/0176189 A1 | 6/2018 | Paul et al. |
| 2018/0343236 A1 | 11/2018 | Pillay-Esnault et al. |
| 2019/0014086 A1* | 1/2019 | Meyer ................. H04L 63/0236 |
| 2019/0058690 A1 | 2/2019 | Huang et al. |
| 2019/0081854 A1 | 3/2019 | Pham |
| 2020/0412694 A1 | 12/2020 | Vanderveen et al. |

OTHER PUBLICATIONS

Pettersen, Y.; "The Transport Layer Security (TLS) Multiple Certificate Status Request Extension"; RFC 6961; Jun. 2013; 10 pages.

Autosar; "Specification of Update and Configuration Management", Autosar AP Release 17-10; Document ID 888; Oct. 27, 2017; 13 pages.

Uptane; "Securing Software Updates for Automobiles"; https://uptane.github.io/design.html; Jun. 25, 2019; 4 pages.

Office Action dated May 25, 2021; U.S. Appl. No. 16/453,514, filed Jun. 26, 2019; 22 pages.

Notice of Allowance dated Oct. 14, 2021; U.S. Appl. No. 16/453,514, filed Jun. 26, 2019; 10 pages.

European Extended Search Report; Application No. 20175879.4; dated Nov. 5, 2020; 7 pages.

Chinese Office Action; Application No. 202010591161.8; dated May 25, 2023; 18 pages.

\* cited by examiner

METHOD AND SYSTEM FOR UPDATING OF AN APPLICATION LAYER FOR A THIRD-PARTY TELEMATICS PROVIDER

CROSS-REFERENCE TO RELATED APPLICATIONS

This application is a continuation of U.S. patent application Ser. No. 16/453,514 filed Jun. 26, 2019 by Michaela Vanderveen, et al. entitled, "Method and System for Updating of an Application Layer for a Third-Party Telematics Provider", which is incorporated by reference herein as if reproduced in its entirety.

FIELD OF THE DISCLOSURE

The present disclosure relates to data provision to a system, and in particular relates to the changing of data provision source to the system.

BACKGROUND

An application within a system may require external data to operate. For example, in a vehicle system, an electronic control unit (ECU) may include a software code that requires obtaining of updates, services, or other data from an external server.

Often such application is behind a firewall in order to protect the system from malicious actors. In this regard, the data from the external server may need to pass through such firewall in order to be obtained by the application. In some cases, the connection between the application and the external server may be permitted by the firewall through whitelists or may be denied based on blacklists.

However, if the external server providing the data to the application within the system changes, one or both of the firewall and the application need to also efficiently and securely change to allow data from the new external server to be provided to the application.

BRIEF DESCRIPTION OF THE DRAWINGS

The present disclosure will be better understood with reference to the drawings, in which.

DETAILED DESCRIPTION OF THE DRAWINGS

Figure 1:
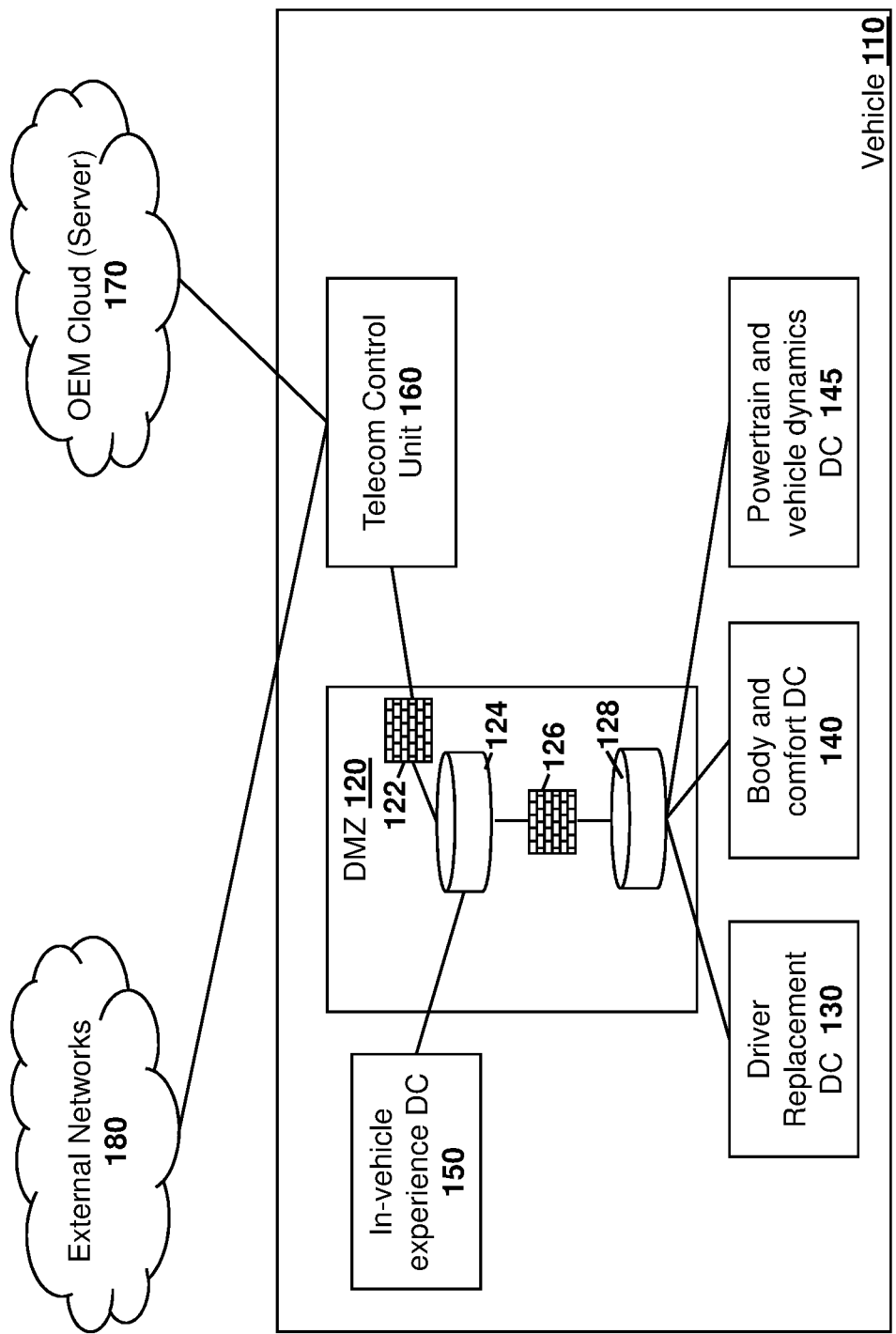
FIG. 1 is a block diagram showing an example architecture for a computing system having a plurality of the domain controllers behind one or two firewalls.

The present disclosure provides a method at a system a firewall and at least one application, the method comprising: obtaining, at the at least one application, a new address for a service provider for the at least one application; triggering a firewall update; obtaining a new firewall configuration; and updating the firewall, wherein the updating the firewall allows a connection from the at least one application to the new address for the service provider.

The present disclosure further provides a computing system including a firewall and at least one application, the computing system comprising: a processor; and a communications subsystem, wherein the computing system is configured to: obtain, at the at least one application, a new address for a service provider for the at least one application; trigger a firewall update; obtain a new firewall configuration; and update the firewall, wherein the updating the firewall allows a connection from the at least one application to the new address for the service provider.

The present disclosure further provides a computer readable medium for storing instruction code, which, when executed by a processor of a computing system having a firewall and at least one application, causes the computing system to: obtain, at the at least one application, a new address for a service provider for the at least one application; trigger a firewall update; obtain a new firewall configuration; and update the firewall, wherein the updating the firewall allows a connection from the at least one application to the new address for the service provider.

In the embodiments described below, the following terminology may have the following meaning, as provided in Table 1.

TABLE 1

| Terminology | |
|---|---|
| Term | Brief Description |
| Original Equipment Manufacturer (OEM) | An OEM is the maker of a system that includes other companies' subsystems. |
| Original Equipment Manufacturer (OEM) configuration provisioning server | A functional entity that provides vehicles with one or more configuration files. |
| Electronic Control Unit (ECU) | An embedded system that controls one or more of the electrical systems or subsystems in a motor vehicle. |
| Domain controller | A type of centralized ECU that is interconnected with other ECUs. The collection of ECUs served by a domain controller may perform similar or related functions and or may be physically close to one another. The domain controller may perform centralized processing and message routing for the ECUs that it |

TABLE 1-continued

Terminology

| Term | Brief Description |
|---|---|
| | serves and may contain firewall functionality. |
| [Automotive] Gateway | A type of electronic control unit that facilitates communications between in-vehicle network domains, and also with external entities. |
| Firewall | A firewall is a network security system placed between a trusted network and an untrusted external network that monitors and controls incoming and outgoing network traffic based on security rules. In some cases, the firewall may include a whitelist of network addresses to which a connection between a component in the trusted network is allowed through the firewall. In other cases, the firewall may include a capability to inspect application layer messages and determine whether they should be permitted to traverse the firewall. |
| Address | An address or network address is any logical or physical address that distinguishes a network node or device over a computer network. Examples can include Uniform Resource Identifiers; Uniform Resource Locators; Internet Protocol addresses; medium access control addresses; among others. |
| Service Provider | A service provider is a network node or entity that provides information or data to a consumer of the information or data. Examples may include audio data from an audio streaming service provider, map data or traffic data from a navigation data service provider; maintenance reminders from a fleet management service provider; among others. |
| Firewall update | A firewall update is an update of the security rules in a firewall. A firewall update can include receiving a new firewall configuration for adding prohibited addresses to a blacklist or permitted addresses to a whitelist. |
| Firewall configuration | A firewall configuration includes the settings of a firewall, including ports on the firewall that are open and closed, a blacklist, a whitelist, and/or traffic rules for traffic types or traffic content that is permitted across the firewall. |
| Connection | A connection is an established communications channel between two computers. The computers may be network elements and the connection may be across a plurality of network nodes in some cases. The connection may be secured through encryption in some cases. |
| Whitelist | A whitelist is a list of network addresses considered to be acceptable or trustworthy as an endpoint of communication. |

In accordance with embodiments of the present disclosure, various solutions address the problem of how to efficiently and securely change only an external server identifier such as a name, domain and/or address that is hosting or making available the content of interest to the application. In other words, the application code for processing the data stays the same, but the endpoint of communication to the server or cloud is changed.

In the examples described below, the application is part of a vehicle computing system. However, the use of the vehicle system is merely provided as an example, and in other embodiments, other types of computing systems in which an application is behind a firewall are equally applicable to the methods and systems described herein. The firewall is often implemented as part of, or in conjunction with, the automotive gateway on the vehicle.

Further although in the present disclosure it is frequently stated that the firewall is in the gateway, in alternative embodiments the firewall could be in an ECU or a domain controller. Also, in some cases there may be more than one firewall in any communication path between end point and server, for example there may be firewalls on ECU, domain controller and gateway. Further, in some cases updates to these multiple firewalls is possible, according to the techniques described herein.

Further, in the present disclosure the gateway is described as performing various functions. However, when the present disclosure provides that a gateway performs a function, in some cases it may mean that firewall or other software/functions hosted on the gateway performs that function.

In a vehicle environment, downloading software updates from a vehicle's Original Equipment Manufacturer (OEM) to the gateway in the vehicle may be done securely. However, updating Electronic Control Units (ECUs) within the vehicle from a remote source is a harder problem because ECUs may not allow for software updates over the air in some cases, or in other cases the vehicle manufacturer may deem the remote updating of such systems to be too high risk. In other cases the variety of different proprietary software update schemes used by different ECU manufacturers, and the differing network and bus types used to inter-connect ECUs makes the ECU software update problem a complex one to solve. If it is desired to support the possibility of changing an external content server, whilst the application that is consuming that content remains the same, then it is preferable and possible to seek methods for solving this problem of change in the external content server that does not involve software update of the ECU end point.

For example, an ECU may be associated with an infotainment system within a vehicle. The infotainment system may include a navigation application which uses an external server to provide map data to the ECU. If the location or provider of such map data changes, then one or both of the application and a firewall on the vehicle need to become aware of the change and allow the data to come from the new external server.

As described below, in some cases, a high-level solution involves the gateway modifying the firewall with a new Universal Resource Locator (URL) or other address associated with a cloud service and/or server. In this type of solution, the application itself cannot be updated, but the gateway can obtain a new firewall configuration to update a whitelist on the firewall, thus reflecting a change in the external server to be used for the application.

In some embodiments, a gateway can employ an application proxy and read the new URL given to the application by an OEM cloud configuration server, and thus update the firewall.

Alternatively, the gateway can be triggered to check for firewall updates by itself. For example, this may be in response to an attempt by an application to reach a content server that is not on the whitelist at the firewall.

In still a further alternative embodiment, the gateway can open a secure tunnel to the new server unbeknownst to an application that is under the impression that it is still communicating with the old server.

Other embodiments for updating the firewall are further provided below.

As used herein, a gateway could be an ECU which contains or hosts multiple functionalities. Generally, it is a hardware and software platform that supports, one or more of, interconnection of different external and internal networks, routing, bridging, protocol translation, firewalling, man in the middle TLS inspection, secure intra-vehicle or extra-vehicle tunneling, OTA software update functionality (e.g. requesting, receiving, storing and inspecting software updates for distribution to other ECUs), collecting logs for upload, among other functionality.

Reference is now made to FIG. 1, which shows an example architecture for a vehicle for use with the embodiments described herein. In the example of FIG. 1, a vehicle 110 may connect to a private network such as an OEM cloud service or server 170. This connection may be used for some services and for diagnostics or configuration data transfer.

Further, the vehicle 110 may also communicate with external networks 180 for various data needed for the user/driver applications within a vehicle 110. For example, services from external networks 180 may include navigation, parking assistance, weather reports, among other such data. In other cases, the external networks may provide updates to various system components within a vehicle 110. Other options for types of data are also possible.

In the embodiment of FIG. 1, vehicle 110 includes a de-militarized zone (DMZ) 120 which includes an externally facing firewall 122 and a gateway 124. In the example of FIG. 1, a further firewall 126 with a gateway 128 may be used to partition safety or other critical systems within the vehicle. For example, a driver replacement domain controller (DC) 130, a body and comfort DC 140, a powertrain in vehicle dynamics DC 145, among other such domain controllers may communicate with gateway 128. These domain controllers are considered to be more sensitive and are therefore behind firewall 126.

In other cases, less sensitive or less trusted domain controllers may communicate directly with gateway 124 within the DMZ 120. For example, an in-vehicle experience DC 150 may communicate with gateway 124 and provide such services as navigation, social media access, media players, among other such services.

Communications with the external world typically occurs through a telecom control unit 160, which may then communicate through a communications channel such as either a short or long range communications system. For example, the communications system may be a Wi-Fi or cellular communications system which provides connectivity with the OEM cloud server 170 and/or external networks 180 in some cases.

Figure 2:
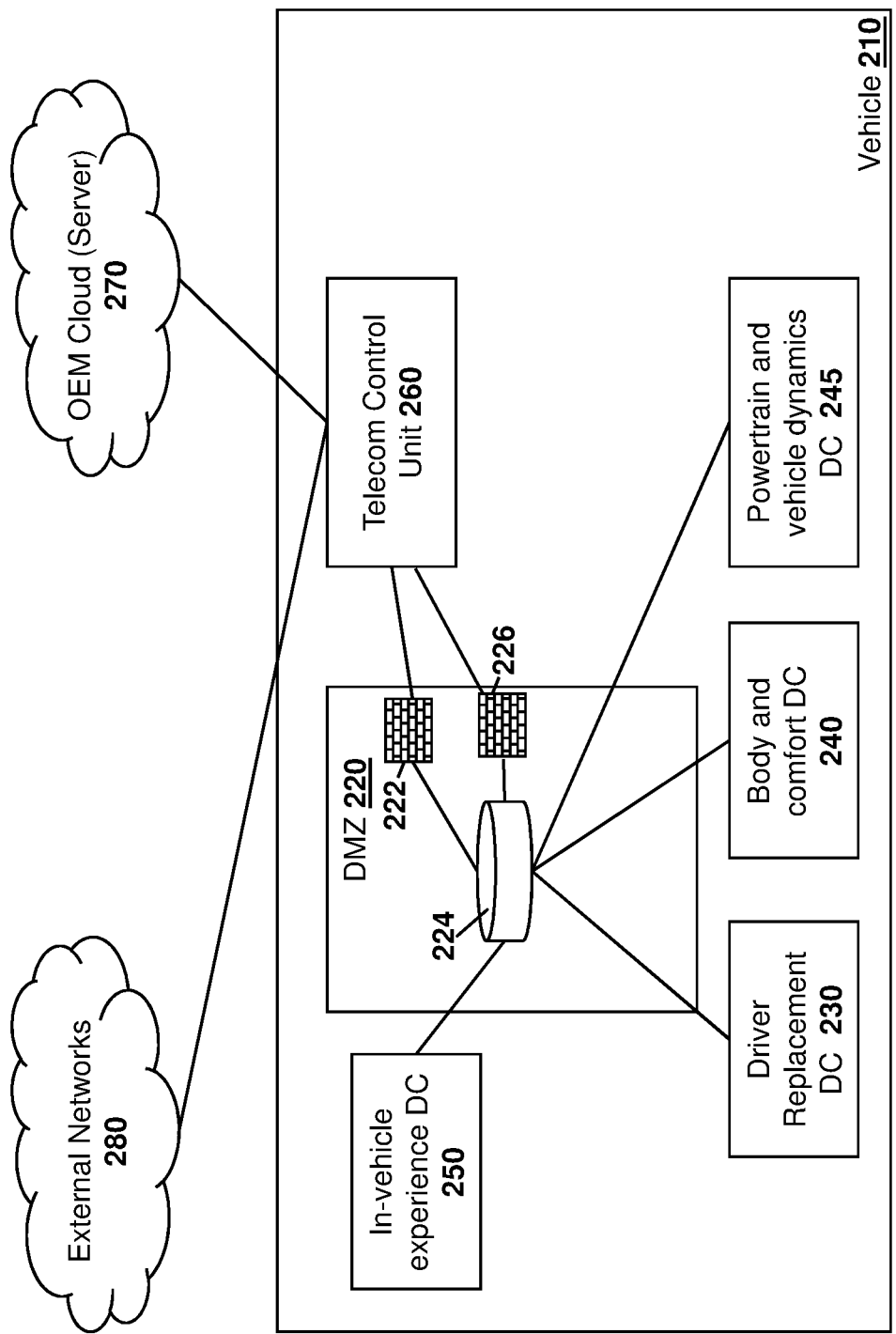
FIG. 2 is a block diagram showing an example architecture for a computing system having a first firewall for inspecting communications to and from a public external network and a second firewall for inspecting communications to and from a private external network (OEM cloud)

However, the architecture of FIG. 1 is merely one example. Other architectures are possible. For example, reference is now made to FIG. 2. In the embodiment of FIG. 2, a separate connection can be provided from the vehicle 210 to the OEM cloud server 270 than from the vehicle 210 to the external networks 280. For example, such separate connections might share the same cellular physical or Medium Access Control (MAC) address but may be separated through the use of cellular Access Point Names (APNs). Other options for separation are possible.

In the architecture of FIG. 2, the DMZ 220 may include a first firewall 222 between the external networks and an in-vehicle network hosting trusted or non-safety critical applications, such as the in-vehicle experience DC 250. A second firewall 226 may be used for access to the OEM cloud server 274 hosting trusted and safety critical applications such as the driver replacement DC 230, body and comfort DC 240, and powertrain in-vehicle dynamics DC 245 shown in the example of FIG. 2. Configuration of firewalls 222 and 226 may be done through a gateway 224.

As with the embodiment of FIG. 1, a telecom controlling unit 260 may allow wireless access to either of the OEM cloud 270 or the external network 280.

In the embodiments of FIGS. 1 and 2, firewalls 122, 126, 222 and 226 may be based on whitelists rather than blacklists. That is, the firewall allows outgoing connections only to URLs, domains, or IP addresses that are listed in a whitelist. All other connection attempts will be blocked.

Further, all incoming connections are also typically blocked. For diagnostic purposes, a vehicle can be triggered to go to the cloud to upload its data logs and obtain the latest configuration files, where this triggering may be achieved for example via short message service (SMS) to the cellular modem.

The embodiments of FIGS. 1 and 2 are merely provided as examples of systems which may include applications that need data from an external server. Other architectures are therefore equally possible.

ECU Updates Via a Network

Using a system architecture such as that described in FIG. 1 or 2 above, the software within the system may need to be updated. For example, an application running on an ECU may need updating. Such update is similar to a "security patch" as is common for cellular phone applications or personal computing operating systems. An update may be triggered based on a security requirement, based on changes that are made for business reasons, or for feature updates.

Figure 3:
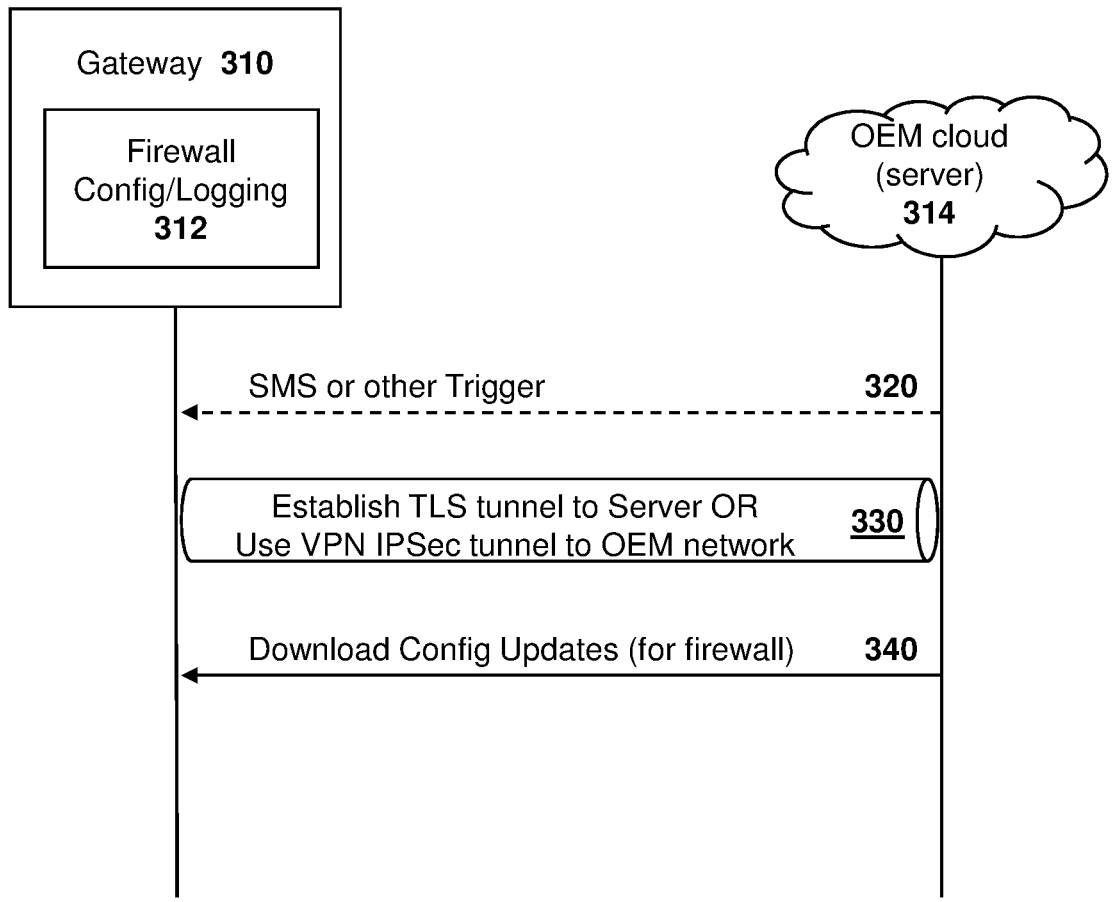
FIG. 3 is a dataflow diagram showing the obtaining of configuration updates for a firewall from an external server.

Reference is now made to FIG. 3, which shows an example high level message flow for updating an ECU in a vehicle. In the example of FIG. 3, a gateway 310 with a firewall configuration or logging module 312 may be used to establish a secure tunnel with an OEM network such as OEM cloud server 314. In other examples, a different entity within the system may establish the connection to the OEM cloud server 314.

In general, the OEM server needs to be aware of all connections to external servers made from a vehicle since the OEM controls the gateway firewall whitelist. However, there may be changes in some cases to the gateway firewall whitelist such as, for example, if an application is no longer allowed to contact a certain server. In other cases, the changes may need to be made to a temporarily disabled service. In other cases, the whitelist may need to be changed if the application is to connect to a different server.

One example of a use case would involve a map or navigation application within a vehicle. Typically, such a map or navigation application goes to a map provider server and retrieves current and local maps for the application to use. In some cases, the provider of such navigation or map data may change. An update may consist of only the address of the content server that the application is to contact.

In this regard, the OEM cloud server 314 may provide a trigger 320 to the gateway 310. For example, the trigger may be a short message service message in some cases. However other triggers between the OEM servers and the gateway are possible.

Once the gateway 310 receives the trigger 320, it may then establish a secure tunnel or connection to the OEM cloud server. For example, such a secure connection is shown at block 330 and may be a Transport Layer Security (TLS) tunnel to the server or a Virtual Private Network (VPN) Internet Protocol Security (IPSec) tunnel to the server in some cases. Other examples of secure connections or tunnels are possible.

Once the secure connection of block 330 is established, configuration updates may be downloaded for the firewall, as shown by message 340.

However, one issue with the above is how to efficiently and securely change only the external server name/domain/address that is hosting or making available the content of interest to the application. That is, the application code for processing may stay the same, but the endpoint of the communication needs to be changed.

Further, a first sub-problem of the above is how to manage the change and become aware of the change without requiring over the air or software updates to the in-vehicle application. Not every OEM will have a solution for an over the air software update.

A second sub problem to the above is how to update the firewall whitelist to allow connectivity to the new IP address or URL while blocking connectivity to the previous IP address or URL.

Figure 4:
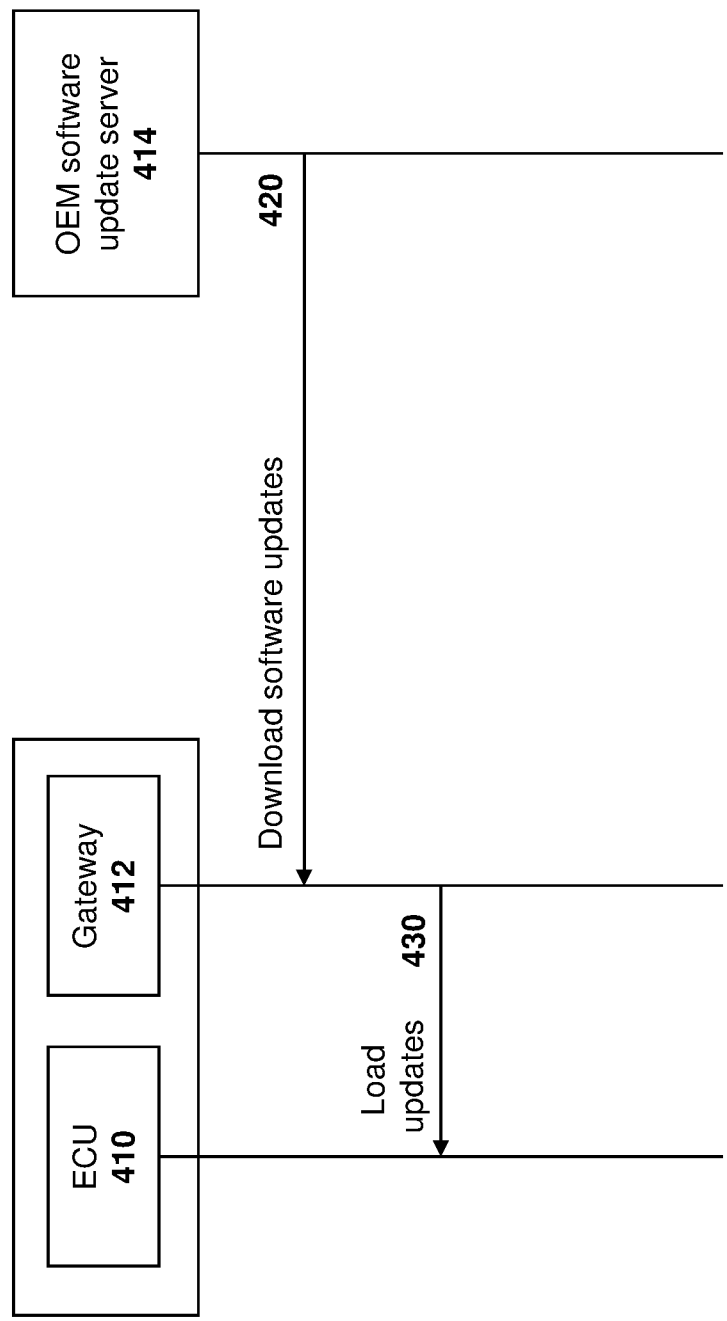
FIG. 4 is a dataflow diagram showing the loading of updates for an electronic control unit.

Reference is now made to FIG. 4, which shows two steps to a software update. In the example of FIG. 4, the second step of the software update from the gateway to the ECU may be less secure and more complex than the first step. In particular, the OEM software update server 414 needs to push software updates to ECU 410 through gateway 412. In this regard, the OEM software update server 414 may download software updates as shown with message 420 to the gateway 412. The downloaded updates may then be loaded to the ECU, as shown with message 430.

The problem at the embodiment of FIG. 4 is that a desired effect is to run both messages 420 and 430 (or one message set from the OEM to ECU 410). However, the ECU 410 cannot be directly reached to download software or configurations.

Downloading Updates

In the embodiments described herein, a gateway modifies a firewall with a new URL or server address for the service to provide data to an application running within the system. In this type of solution, an application itself cannot be updated, but the gateway can obtain a new firewall configuration to update a whitelist at the gateway, thus reflecting a change to the external server to be used for that application.

Specifically, if a server for a service provider is updated, for example a new map provider is to be used, it is possible that the Fully Qualified Domain Name (FQDN) or uniform Resource Identifier (URI) of the server to which the connection is sought is not on the gateway's firewall whitelist. As used throughout the specification, the address obtained may be for the old service provider at a new address, or may be for a new service provider.

Based on this, two steps are used to solve the problem of updating a service provider. The first step involves becoming aware of the URL (address) change and obtaining a new URL. This may be done either by the application or by the gateway.

A second step is enacting the change in the firewall or the gateway acting as the equivalent of having changed the firewall.

Each is described below.

Managing the Change

The change of the server providing data to an application may be managed in several ways.

In a first aspect, both the application and gateway may become aware of the change. For example, in one case, the application may get a new URL. This may be done through a HyperText Transfer Protocol (HTTP) connection to a certain OEM server. Further, the gateway may perform application layer packet inspection on the incoming packets to find information that has changed. Therefore, in this aspect an application may receive a connection change message over the HTTP connection which may be inspected by the gateway and therefore both become aware of the change.

In a second aspect, an application may find out about the change first. The application in this case may get the new URL via a means such as an HTTP connection to a certain OEM server. In this case, the gateway does not inspect or intercept messaging. Therefore, the first time that the gateway knows that there was probably a change is when the application tries to connect to the new server and the firewall will not allow it. In some cases, the application may request the gateway to update its firewall, and the gateway may then go to the OEM cloud to obtain a new configuration file.

In a third aspect, the gateway may find out before the application that a change is made. For example, the gateway (firewall) may periodically, or on demand, go to an OEM server and find out that there is a new URL for a particular service. In this case, the firewall may get a command to replace an old URL with a new one, before the application actually seeks a connection to a URL.

Updating the Firewall

Once a change of the server is known to one or both of the application and gateway, the firewall whitelist needs to be updated. Specifically, if the firewall is not updated, the ECU application will not be able to get the service. This can be solved in various ways.

In a first aspect, the gateway may intercept the request from an application that is oblivious to the change and establish a secure connection to a different server than the one that the application asked for. In this case, the gateway transparently may pass data to or from the new server. As will be appreciated by those in the art, the data format coming from the new server may in some cases need to be similar to the data format from the old server in order to ensure that the application can process such data.

In a second aspect, the gateway may update the firewall by itself, either before or after the application seeks the new service. For example, in some cases the application may request the firewall update. In other cases, the gateway may obtain information, for example through a periodic connection with the OEM server, and find out that the firewall has changed. The gateway can, in some cases, inform the application that the URL has changed if the update was not performed based on a request from the application. In this aspect, a new connection may then be opened, which the gateway firewall allows, and data flows as normal between the application and the new server.

In the third aspect, the gateway may simply update the firewall without any special interaction with the application. For example, this may be done if the gateway finds out about the change either before or concurrently with the application.

The various aspects of managing the change and the updating of the firewall may be paired in a plurality of ways. These are described below.

Gateway as an Application Proxy

In a first embodiment of the present disclosure, both the application and gateway may find out about the new service provider. Further, in this first embodiment, the gateway may update the firewall without any special interaction with the application.

Figure 5:
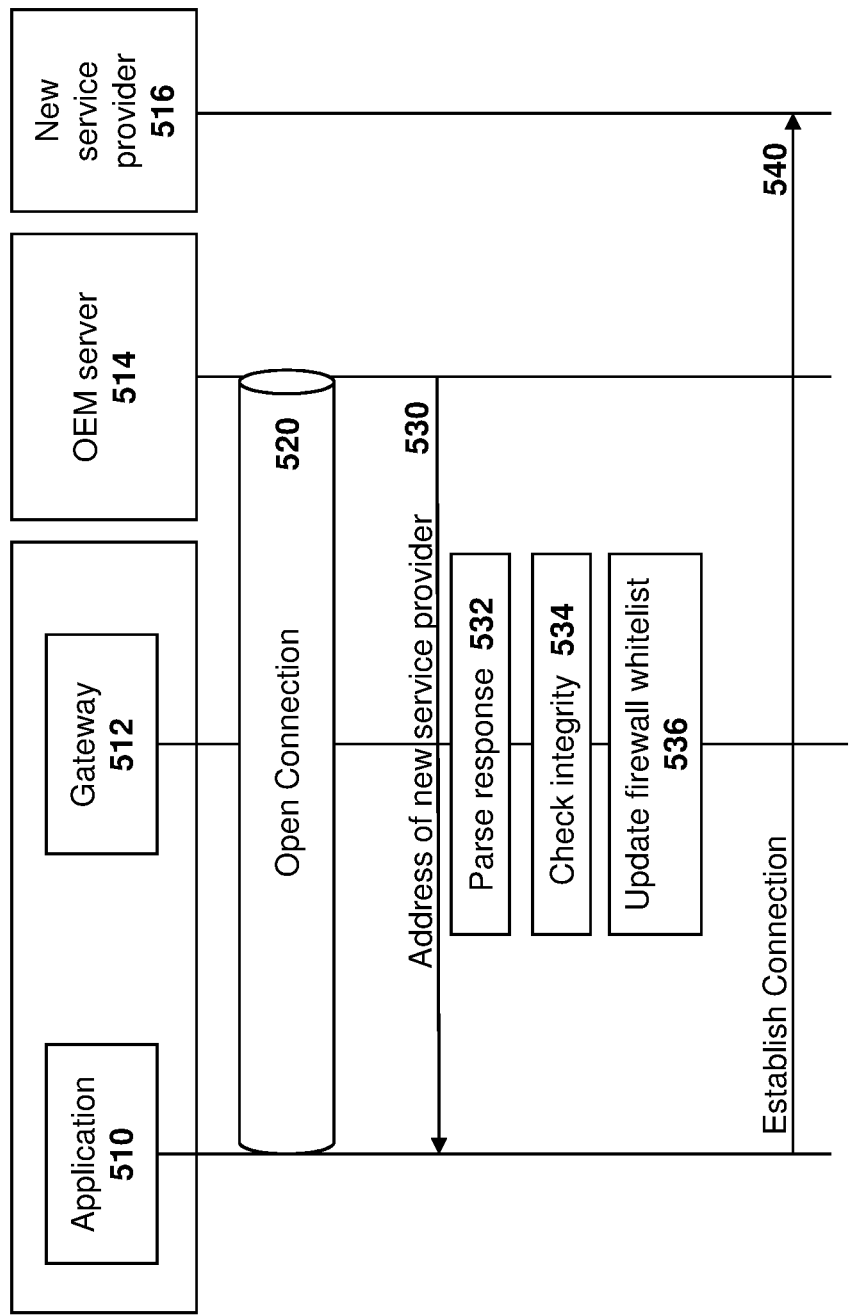
FIG. 5 is a dataflow diagram showing a gateway monitoring and updating a firewall based on an application receiving a new service provider address.

In particular, reference is now made to FIG. 5. In the embodiment of FIG. 5, an application 510 may communicate through gateway 512 to OEM server 514 to find a service provider. This may be done, for example, utilizing an HTTP GET message to a configuration server via a TLS tunnel 520 (e.g. via Hypertext Transfer Protocol Secure (HTTPS)). However, other messaging may be equally be used to communicate with the OEM server 514.

In response to the HTTP GET message, the OEM server 514 provides application 510 with an address of the new service provider 516, as shown in message 530. For example, such address may be a new URL.

The gateway 512 may monitor messaging between application 510 and OEM server 514, and in this regard, the gateway 512 may parse the response message 530, as shown at block 532, to determine that a new a fully qualified domain name or URL has been allocated for a service for the application. In order to do this, the gateway may employ not just a firewall but also a Man-In-The-Middle (MITM) or application-layer proxy in order to decrypt the information and extract the new URL.

If a new address is allocated, as determined at the gateway, then the gateway may check the integrity of the message at block 534 to ensure that the message is legitimate. The check may further include determining whether the whitelist includes the new service provider address. In particular, the gateway needs to have a mapping to show which entry in the whitelist is the one that corresponds to the application's service provider. This mapping may be achieved, for example, by configuration.

The gateway may then, as shown at block 536, update the firewall whitelist with the new URL and remove the old URL from the whitelist.

Thereafter, when application 510 tries to connect with the new service provider 516, for example as shown with message 540, then the connection is allowed through the firewall to the new service provider.

In accordance with the embodiment of FIG. 5, the gateway may monitor traffic and find out about the changes on its own without the application needing to be aware that the firewall needs to be updated or performing any explicit action to update the firewall.

Gateway Securely Updates Firewall

In a further embodiment of the present disclosure, the application may obtain a new address for a service provider, but the gateway does not intercept or inspect the messaging used to obtain such new address. However, the gateway may still update the firewall without any special interaction with the application in this embodiment. The address may be obtained, for example, through communication with a server in some cases. In other cases, a new service provider URL may be provided to a configuration file that the application then reads.

Figure 6:
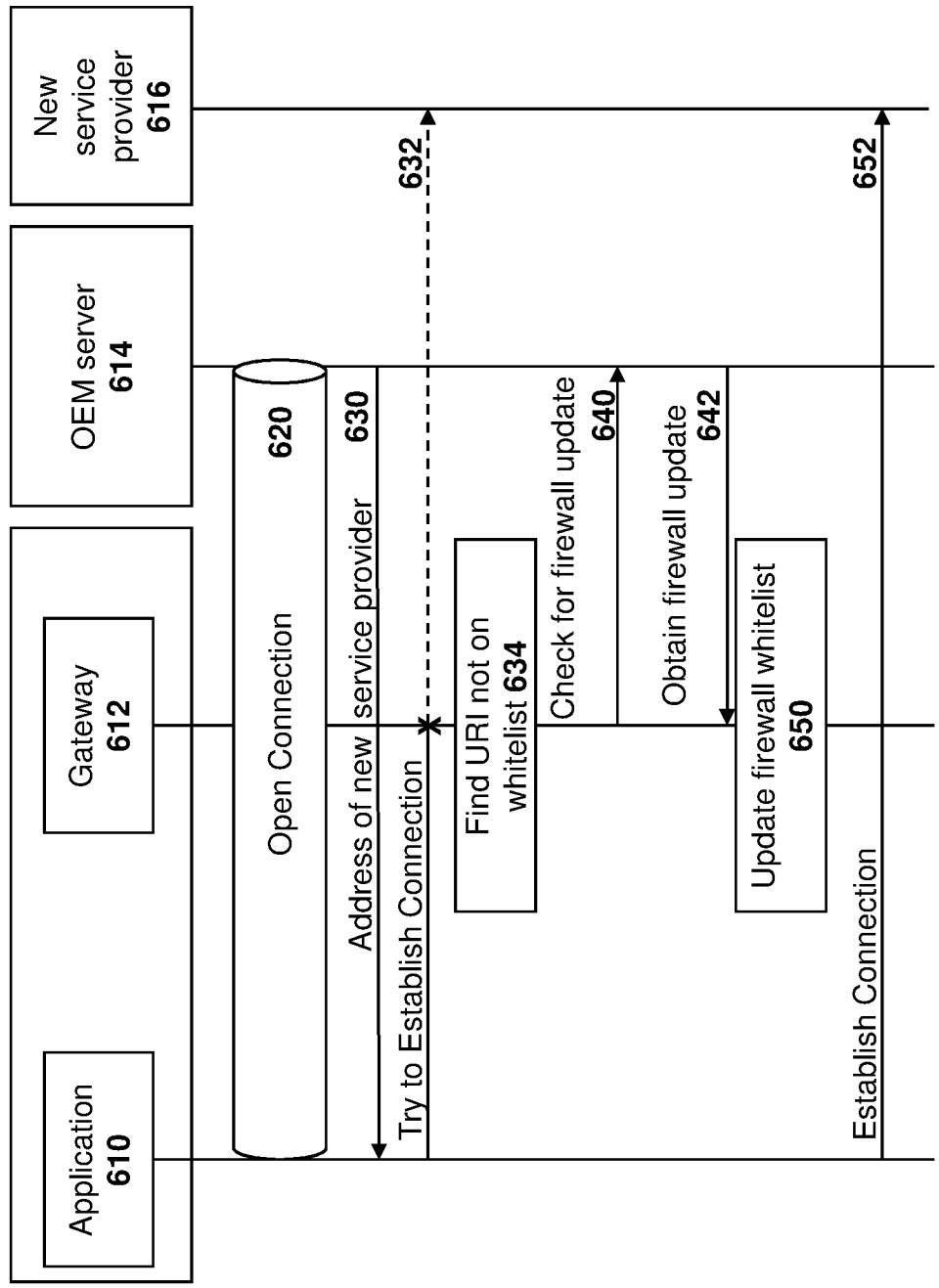
FIG. 6 is a dataflow diagram showing an application receiving a new address for a service provider and a gateway interpreting an attempt to establish a connection with the new service provider as a trigger to obtain firewall updates.

Reference is now made to FIG. 6. In the embodiment of FIG. 6, an application 610 may obtain a new service provider address from an OEM server 614 via communications through a firewall in gateway 612.

The new address may be obtained, for example, through a message such as an HTTP GET message through a TLS tunnel, as shown with connection 620. However other options for obtaining the new address are possible.

In response to the request for the address of the service provider, the address of the new service provider may be provided at block 630. However, in some cases the application 610 may be unaware that the address is for a new provider or may not realize or have the capability to provide updates to a firewall.

In this regard, the application 610 tries to establish a connection to the new service provider 616 as shown with message 632. However, as the new service provider 616 is not yet on the whitelist at the firewall, gateway 612 blocks the connection attempt.

In the embodiment of FIG. 6, instead of merely blocking the connection attempt, the gateway may check to see that the URL or address is not on the whitelist, but since it is associated with an application that is a legitimate application on the system, the gateway may then go to the OEM cloud to check whether there has been an update to the application service provider.

In particular, as seen in FIG. 6, the gateway 612 finds that the URI or URL is not on the whitelist, as shown at block 634 and may then send a message to the OEM server 614 to check for firewall updates, as shown by message 640.

The gateway receives message 642 back from the OEM server providing a firewall update.

The gateway 612 may then update its firewall whitelist, as shown at block 650, by adding the new service provider 616 and removing the old service provider.

The application 610 may need to wait until the firewall opens and then try again. This is shown with message 652. In this case, as the firewall whitelist has been updated, the connection at message 652 will be allowed.

Therefore, based on the embodiment of FIG. 6, the application does not need to provide any messaging to the gateway to explicitly request a firewall update.

Figure 7:
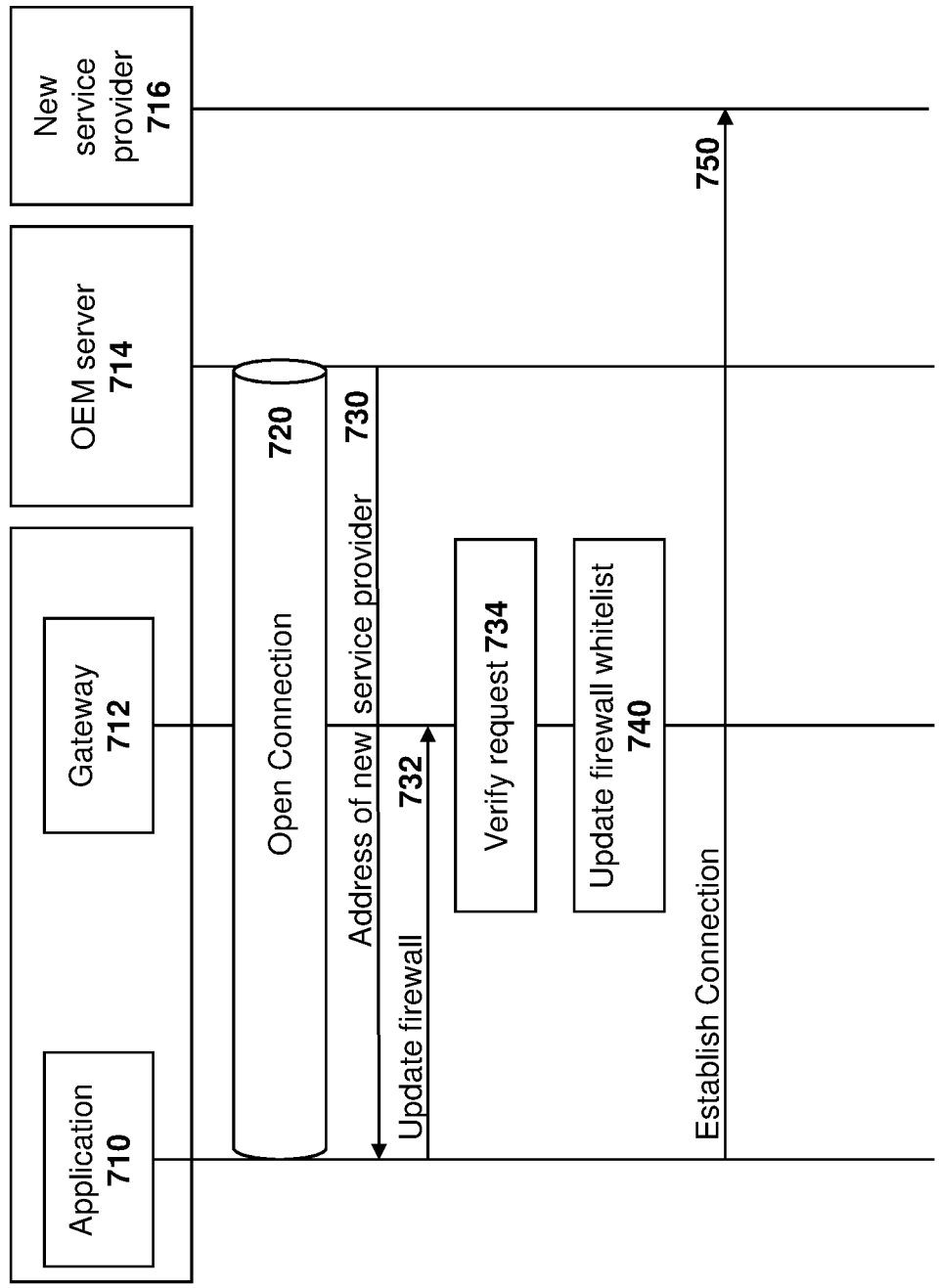
FIG. 7 is a dataflow diagram showing an application receiving a new address for a service provider and providing a gateway with information to update a firewall.

Alternatively, in some cases the application itself may request that the firewall be updated. Reference is now made to FIG. 7.

In the embodiment of FIG. 7, an application 710 communicates with an OEM server 714 through a gateway 712 to obtain service provider information. This may be done, for example, through a TLS connection 720 utilizing an HTTP GET message. However, other messaging to obtain an address would be possible.

However, in other cases the application 710 may monitor a configuration file (not shown) as described above.

In response to the request to obtain the service provider address, the OEM server 714 provides the address of a new service provider in message 730. In the embodiment of FIG. 7 the gateway 712 does not monitor the message and is therefore unaware of the service provider change.

Application 710, on receiving message 730 or on reading the configuration file and finding a change, realizes that that there has been a change in the service provider. In the embodiment of FIG. 7, application 710 has enough intelligence programmed therein to realize that a firewall update is needed. In this regard, application 710 may send message 732 to gateway 712 in order to update the firewall.

Gateway 712, on receiving message 732, may verify the request as shown at block 734. In particular, message 732 could provide the firewall with the FQDN/URL address of the old service provider, if the application has it, as well as a new FQDN/URL which the application obtained from the OEM server 714. In some cases, the FQDN/URL configuration could be cryptographically protected with a digital signature that the gateway may be able to verify at block 734 in order to ensure that the change in address is a legitimate change.

Once the request is verified at block 734, the gateway 712 may then update the firewall whitelist with the information provided in message 732, as shown at block 740. This may involve adding the address of the new service provider and removing the address of the old service provider.

Once the firewall is updated, the application 710 may establish a connection 750 with the new service provider 716 by successfully passing through the firewall.

Therefore, based on the embodiment of FIG. 7, the application 710 contains software to notify the gateway of a service provider change in order for the firewall update to occur.

Application is Unaware of Service Provider Address Change

In a further embodiment of the present disclosure, a gateway may periodically or on demand go to an OEM server and find out that there is a new address associated with a service provider. If the address has changed, then the gateway in some cases may replace an old URL or address with a new one on the whitelist. Further, in this embodiment, the gateway may either intercept a request from the application to establish a TLS tunnel to the old server or may tell the application that the address for the service provider has changed.

Figure 8:
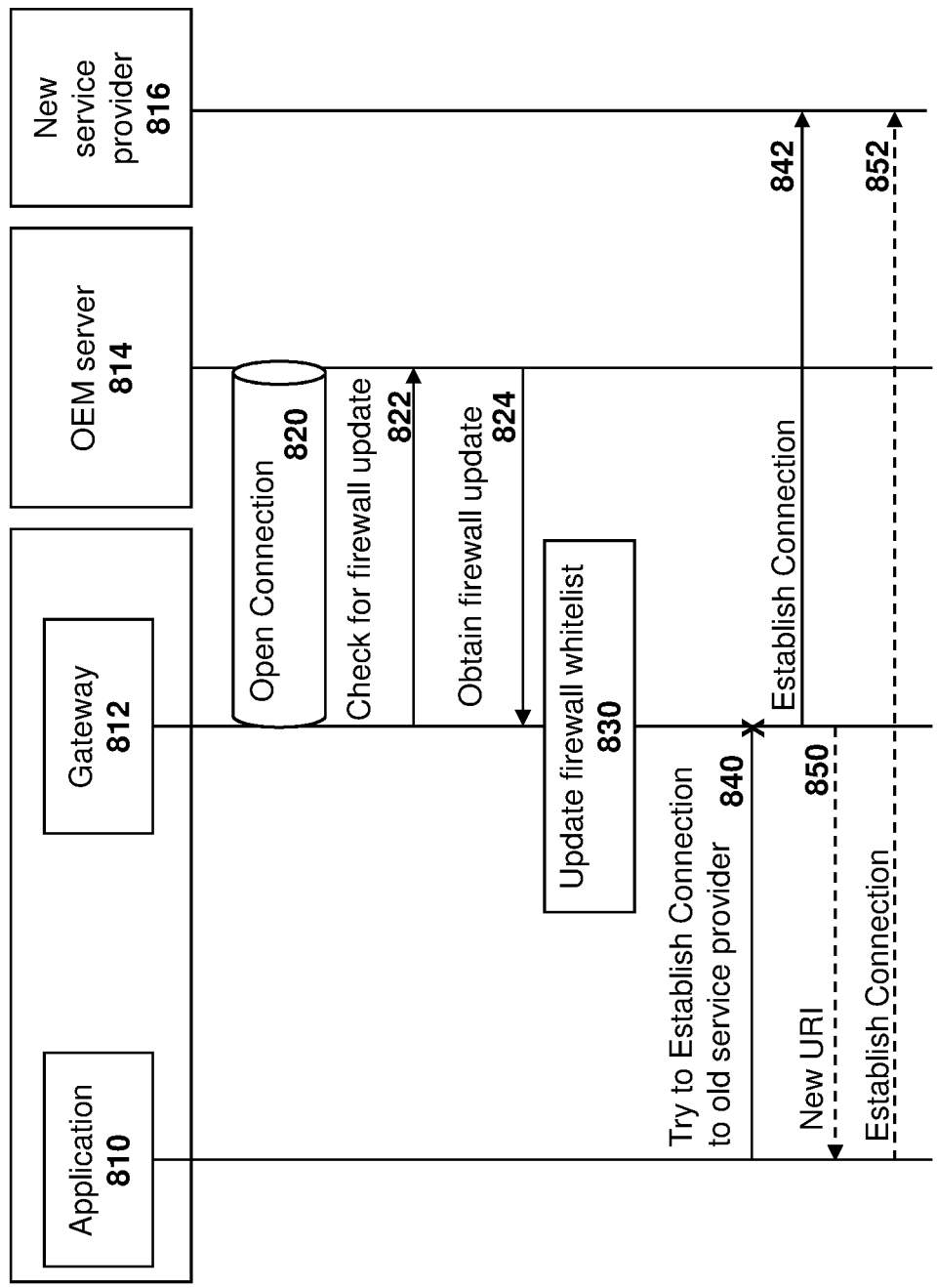
FIG. 8 is a dataflow diagram showing a gateway obtaining configuration information for a firewall including a service provider update and either relaying communications transparently from an application or providing the new address to the application.

Reference is now made to FIG. 8. In the embodiment of FIG. 8 an application 810 communicates with a gateway 812. Further, the gateway 812 may communicate with OEM server 814.

In accordance with the embodiment of FIG. 8, gateway 812 may periodically update the configuration of the firewall by opening a connection 820 with the OEM server 814. Such connection may be used for configuration, diagnostics and/ or downloads and may be the only action that would count as a software update over the air.

Alternatively, the OEM server 812 may send a message (not shown) such as an SMS message to the gateway 812 to trigger the gateway to open the connection 820.

Once the connection is opened, the firewall software on the gateway may check for firewall updates, as shown at message 822.

The OEM server 814 may provide a firewall update, shown as message 824, back to gateway 812. The gateway 812 may then update the firewall whitelist, as shown at block 830.

Application 810, which is unaware of the address change for the service provider, tries to establish a connection with the old service provider, as shown at message 840. For example, the connection may be a HTTP/TCP connection or a HTTPS/TCP connection to the old service provider server, as configured within the application. In some cases, the old service provider may be in the cloud.

In the embodiment of FIG. 8 the gateway is application aware, meaning that the gateway knows the old address for the service provider, and determines that the address for the service provider is not to be used any longer and that a replacement address provided by the OEM server 814 should be used. In one case, the application is unaware of the new address and so the gateway proxy intercepts the application request to connect to an external server as configured in the application and redirects this traffic to the new service provider 816, shown with message 842, without the knowledge of the application. In this regard, the proxy would instantiate a connection with the new external server, acting on behalf of the application and passing the contents of message 840 (e.g. an HTTP GET) unmodified as message 842. In practice, this may be instantiated as two separate TLS tunnels, for example one between application 810 and the application proxy within gateway 812, and another between the application proxy within gateway 812 and the new service provider 816.

In this case, the HTTP data transfer between the application and external provider server takes place without the application being aware of the change of server. It is assumed that the data formats are compatible between the old and new service providers, or that the application 810 is capable of receiving data in a format from the new service provider 816.

In an alternative embodiment, instead of establishing connection 842, the gateway 812 may provide a new address such as a URI to application 810, as shown in message 850. In this case, the application 810 may trust the gateway 812 and therefore reconfigure the service provider information stored at the application to the new address provided in message 850.

Thereafter, application 810 may be able to establish connection 852 through the firewall with the new service provider 816.

Therefore, the embodiment of FIG. 8 allows the gateway to update the firewall whitelist without intervention from the application 810, and further to intercept communications from the application to the old service provider and either establish a second connection transparent to the application, or inform the application of the change in address of the service provider.

Application Asks Gateway to Update its Firewall

In a further embodiment, the application may obtain the address of a new service provider without knowledge of the gateway. Further, in this embodiment the gateway may thereafter update its firewall upon receiving a request to do so.

Figure 9:
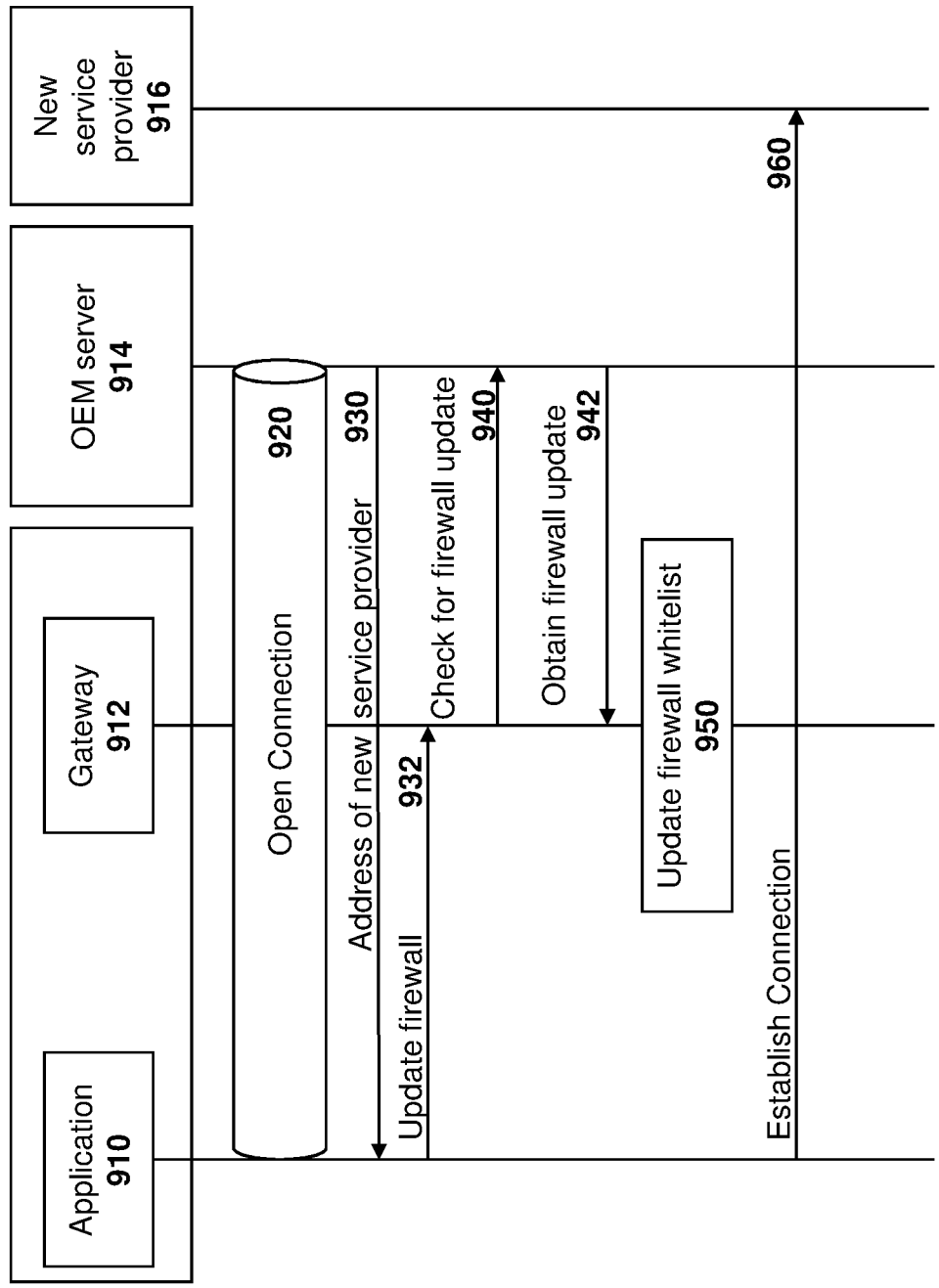
FIG. 9 is a dataflow diagram showing an application prompting a gateway to check for new firewall updates upon the application receiving a new address for a service provider.

Reference is now made to FIG. 9, in which an application 910 communicates through a gateway 912 with a server 914. Server 914 may, for example, be an OEM server or cloud service.

In the embodiment of FIG. 9, application 910 may open a connection 920 with the OEM server 914 for configuration and/or diagnostics and may download a new address for a service provider, shown at message 930.

Application 910 notices a change in the address of the service provider to the address of service provider 916, and therefore informs the gateway 912 through an update firewall message 932. The update firewall message 932 uses signaling or control messaging rather than user data.

On receiving message 932, the gateway 912 may initiate a connection with a server such as server 914 to check for a firewall update, shown with message 940. The gateway 912 may then receive a message from the server 914 with the firewall update, shown with message 942. Messages 940 and 942 could be sent over a secure connection.

Once message 942 is received, the gateway 912 may update its firewall whitelist, shown at block 950.

Thereafter, if the application 910 tries to open a connection such as an HTTPS/TCP connection with the new service provider 916, as shown with message 960, the connection will succeed.

Therefore, the embodiment of FIG. 9 allows the application to inform the gateway that a firewall update needs to be initiated.

For each of the embodiments of FIGS. 5 to 9 above, the server provides the new address, which may be an FQDN/ URL, for the new service provider, and such server would typically sign the message to allow for verification at the gateway.

Further, in some cases, the steps in the embodiments of FIGS. 5 to 9 may occur upon power up or startup of the system (such as the vehicle) and before any user interaction triggers the activation of an application.

The gateway, vehicles, ECUs, systems, servers, and network elements described above may be any computing device or network node. Such computing device or network node may include any type of electronic device, including but not limited to, mobile devices such as smartphones or cellular telephones. Examples can further include fixed or mobile user equipment, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 10:
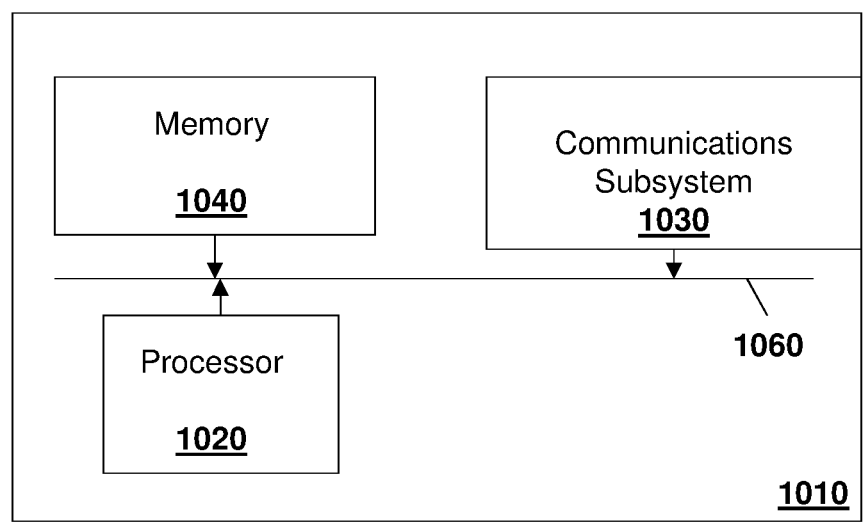
FIG. 10 is a block diagram of a simplified computing device capable of being used with the embodiments of the present disclosure.

One simplified diagram of a computing device is shown with regard to FIG. 10. The computing device of FIG. 10 could be any mobile device, portable device, network node, ITS station, server, or other node as described above.

In FIG. 10, device 1010 includes a processor 1020 and a communications subsystem 1030, where the processor 1020 and communications subsystem 1030 cooperate to perform the methods of the embodiments described above. Communications subsystem 1020 may, in some embodiments, comprise multiple subsystems, for example for different radio technologies.

Processor 1020 is configured to execute programmable logic, which may be stored, along with data, on device 1010, and shown in the example of FIG. 10 as memory 1040. Memory 1040 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1040, device 1010 may access data or programmable logic from an external storage medium, for example through communications subsystem 1030.

Communications subsystem 1030 allows device 1010 to communicate with other devices or network elements and may vary based on the type of communication being performed. Further, communications subsystem 1030 may comprise a plurality of communications technologies, including any wired or wireless communications technology.

Communications between the various elements of device 1010 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method at a system including a firewall, a gateway and at least one application, the method comprising:
monitoring, by the gateway, incoming messages for the application;
detecting, by the gateway, a new incoming message for the application;
parsing, at the gateway, the new incoming message, to determine a new address for a service provider for the at least one application; and
updating a firewall whitelist with the new address for the service provider,
wherein the updating the firewall whitelist allows a connection from the at least one application to the new address for the service provider.

2. The method of claim 1, further comprising performing integrity checking on the new incoming message.

3. The method of claim 2, wherein the integrity checking comprises checking a mapping stored at the gateway to find a service provider related to the application.

4. The method of claim 3, wherein the mapping is configured at the gateway.

5. The method of claim 1, wherein the updating comprises adding the new address to the firewall whitelist and removing an old address from the firewall whitelist.

6. The method of claim 1, wherein the parsing utilizes an application-layer or Man-In-The-Middle proxy at the gateway to decrypt the new incoming message.

7. The method of claim 1, wherein the new address is at least one of a uniform resource locator, a uniform resource identifier, an Internet Protocol address, and a fully qualified domain name.

8. The method of claim 1, wherein the system is a vehicle.

9. The method of claim 1, wherein the new address for the service provider is provided from an Original Equipment Manufacturer server.

10. A computing device including a firewall, gateway and at least one application, the computing device comprising:
a processor; and
a communications subsystem,
wherein the computing device is configured to:
monitor, at the gateway, incoming messages for the application;
detect, by the gateway, a new incoming message for the application;
parse, at the gateway, the new incoming message, to determine a new address for a service provider for the at least one application; and
update a firewall whitelist with the new address for the service provider, wherein the updating the firewall whitelist allows a connection from the at least one application to the new address for the service provider.

11. The computing device of claim 10, wherein the computing device is further configured to perform integrity checking on the new incoming message.

12. The computing device of claim 11, wherein the integrity checking comprises checking a mapping stored at the gateway to find a service provider related to the application.

13. The computing device of claim 12, wherein the mapping is configured at the gateway.

14. The computing device of claim 10, wherein the computing device is configured to update by adding the new address to the firewall whitelist and removing an old address from the firewall whitelist.

15. The computing device of claim 10, wherein the computing device is configured to parse using an application-layer or Man-In-The-Middle proxy at the gateway to decrypt the new incoming message.

16. The computing device of claim 10, wherein the new address is at least one of a uniform resource locator, a uniform resource identifier, an Internet Protocol address, and a fully qualified domain name.

17. The computing device of claim 10, wherein a system is a vehicle.

18. The computing device of claim 10, wherein the new address for the service provider is from an Original Equipment Manufacturer server.

19. A non-transitory computer readable medium for storing instruction code, which, when executed by a processor of a computing system having a firewall, gateway and at least one application, causes the computing system to:
monitor, at the gateway, incoming messages for the application;
detect, by the gateway, a new incoming message for the application;
parse, at the gateway, the new incoming message, to determine a new address for a service provider for the at least one application; and
update a firewall whitelist with the new address for the service provider, wherein the updating the firewall whitelist allows a connection from the at least one application to the new address for the service provider.

20. The non-transitory computer readable medium of claim 19, wherein the instruction code further causes the computing system to perform integrity checking on the new incoming message.

* * * * *